(12) United States Patent
Jan et al.

(10) Patent No.: US 9,804,297 B2
(45) Date of Patent: Oct. 31, 2017

(54) MATERIAL FOR CONTACT LENSES, METHOD FOR MANUFACTURING CONTACT LENSES AND CONTACT LENSES OBTAINED THEREBY

(71) Applicant: BenQ Materials Corporation, Taoyuan (TW)

(72) Inventors: Fan-Dan Jan, Taoyuan (TW); Hsiu-Hao Chang, Taipei (TW)

(73) Assignee: BenQ Materials Corporation, Taoyuan (TW)

( * ) Notice: Subject to any disclaimer, the term of this patent is extended or adjusted under 35 U.S.C. 154(b) by 79 days.

(21) Appl. No.: 14/941,668

(22) Filed: Nov. 16, 2015

(65) Prior Publication Data

US 2016/0370504 A1   Dec. 22, 2016

(30) Foreign Application Priority Data

Jun. 18, 2015  (TW) .............................. 104119823 A

(51) Int. Cl.
| | | |
|---|---|---|
| *C08L 83/02* | (2006.01) | |
| *G02C 7/04* | (2006.01) | |
| *G02B 1/04* | (2006.01) | |
| *B29D 11/00* | (2006.01) | |
| *C08F 290/06* | (2006.01) | |
| *C08G 77/38* | (2006.01) | |
| *B29K 83/00* | (2006.01) | |
| *B29K 105/00* | (2006.01) | |

(52) U.S. Cl.
CPC ........ *G02B 1/043* (2013.01); *B29D 11/00038* (2013.01); *C08F 290/062* (2013.01); *B29K 2083/00* (2013.01); *B29K 2105/0061* (2013.01); *B29K 2995/0092* (2013.01); *C08G 77/38* (2013.01)

(58) Field of Classification Search
None
See application file for complete search history.

(56) References Cited

U.S. PATENT DOCUMENTS

| | | | | |
|---|---|---|---|---|
| 5,019,100 A | * | 5/1991 | Hennink | D06M 15/263 |
| | | | | 351/159.33 |
| 5,334,681 A | * | 8/1994 | Mueller | C08F 290/062 |
| | | | | 351/159.33 |
| 8,377,464 B2 | | 2/2013 | Linhardt et al. | |
| 8,647,658 B2 | * | 2/2014 | Pruitt | G02B 1/043 |
| | | | | 206/5.1 |
| 2014/0155515 A1 | * | 6/2014 | Lai | C08G 18/61 |
| | | | | 523/107 |

FOREIGN PATENT DOCUMENTS

| | | |
|---|---|---|
| CN | 101981470 A | 2/2011 |
| TW | I269912 B | 1/2007 |
| TW | 201420678 A | 6/2014 |
| WO | 2006068705 A1 | 6/2006 |

OTHER PUBLICATIONS

Hideki Sugimoto et al, "Preparation of high oxygen permeable transparent hybrid copolymers with silicone macro-monomers, " Colloid and Polymer Science, vol. 290, Issue 2, pp. 173-181, 2012.

* cited by examiner

*Primary Examiner* — Tae H Yoon
(74) *Attorney, Agent, or Firm* — CKC & Partners Co., Ltd.

(57) ABSTRACT

The invention provides a material for contact lenses, including a first siloxane macromer shown as formula (I):

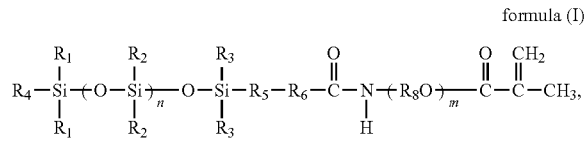

formula (I)

wherein $R_1$, $R_2$ and $R_3$ are independently $C_1$-$C_4$ alkyl groups, $R_4$ is $C_1$-$C_6$ alkyl group, $R_5$ is $C_1$-$C_3$ alkylene group, $R_6$ is —$OR_7O$— or —NH—, $R_7$ and $R_8$ are independently $C_1$-$C_2$ alkylene groups and m is an integer of about 1-2, n is an integer of about 4-80; at least one hydrophilic monomer; a surfactant which is an urethane (meth)acrylate containing poloxamer and an initiator.

17 Claims, No Drawings

MATERIAL FOR CONTACT LENSES, METHOD FOR MANUFACTURING CONTACT LENSES AND CONTACT LENSES OBTAINED THEREBY

CROSS-REFERENCE TO RELATED APPLICATION

This application claims the priority benefit of Taiwanese application serial no. 104119823, filed on Jun. 18, 2015, which is incorporated herein by reference.

BACKGROUND

Technical Field

The present invention relates to a material for manufacturing contact lenses. More particularly, the contact lenses made from a hydrophilic siloxane macromer and a surfactant have high water content, high oxygen permeability and low modulus.

Description of Related Art

In the early years, hard contact lenses were mainly made of glass. The soft contact lenses were therefore developed to improve discomfort of wearing of hard contact lenses. The soft contact lenses can be classified into two categories, hydrogel contact lenses and silicone hydrogel contact lenses.

The hydrogel contact lenses are made from hydrogel materials such as poly-2-hydroxyethyl methacrylate (p-HEMA). Since the limited material characteristics of hydrogel contact lenses, the oxygen permeability (Dk) thereof is only about 15 to 35.

Comparing to the hydrogel contact lenses, the silicone hydrogel contact lenses have higher oxygen permeability because they are made from siloxane macromer and hydrophilic monomers. Although the siloxane macromer structure is able to provide high oxygen permeability, the lower water content and the higher tensile modulus thereof are caused at the same time. If the water content of the contact lens is too low, the wear's eyes will be too dry to induce discomfort. If the tensile modulus of the contact lens is too high, the contact lens-induced conjunctival straining (C.L.I.C.S) of wearers is caused easily. Moreover, if the wearers wear the contact lenses in a wrong way, the sickness of eyes may occur more easily. Therefore, a novel material for manufacturing contact lenses is highly demanded to solve the aforementioned problems.

SUMMARY

The present invention provides a novel material for manufacturing contact lenses including a first siloxane macromer and a surfactant. The first siloxane macromer contains hydrophilic functional groups of carbamate functional group, ether functional group and a carboxyl function group, so that the water content of contact lenses is able to be enhanced. Moreover, the surfactant is an urethane (meth) acrylate containing poloxamer which means the poloxamer is functionalized by the hydrophilic carbamate group and the acrylate in the structure. Therefore, the hydrophilic carbamate group could enhance the water content of contact lenses, and the vinyl functional group of the acrylate in the poloxamer can crosslink with the first siloxane macromer. According to the aforementioned reasons, the contact lenses made from the novel material can provide the characteristics of high water content, high oxygen permeability and low modulus. Meanwhile, the contact lens-induced conjunctival straining (C.L.I.C.S) and discomfort feelings of wearers can be improved.

According to an aspect of the present invention, a composition for manufacturing contact lenses is provided.

The composition for manufacturing contact lenses includes a first siloxane macromer with the number average molecular weight of 500 to 10,000, represented by the following formula (I), formula (I)

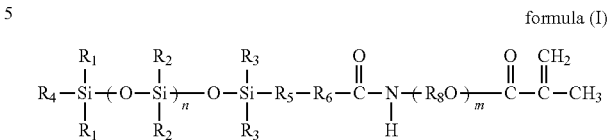

wherein $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$, $R_8$ are independently $C_1$-$C_2$ alkylene groups, m is an integer of 1 to 2 and n is an integer of 4 to 80; at least one hydrophilic monomer; a surfactant which is an urethane (meth)acrylate containing poloxamer and an initiator.

According to another aspect of the present invention, a method for manufacturing the contact lenses is provided.

The method for manufacturing contact lenses includes the following steps. First, a first siloxane macromer, at least one hydrophilic monomer, a surfactant which is an urethane (meth)acrylate containing poloxamer; an initiator and a solvent are mixed to form a mixture. Then the mixture is injected into a mold of contact lens and conducted by a thermal treatment or a UV irradiating treatment to form contact lenses. The first siloxane macromer is represented by the following formula (I) and its number average molecular weight is 500 to 10,000.

formula (I)

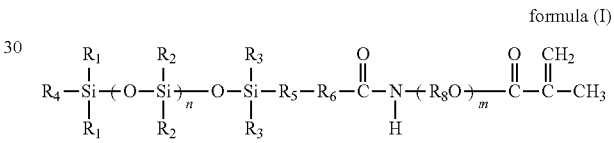

In formula (I), $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$, $R_8$ are independently $C_1$-$C_4$ alkylene groups, m is an integer of 1 to 2 and n is an integer of 4 to 80.

According to a further another aspect of the present invention, a contact lens obtained by the method mentioned above is provided.

The above and other aspects of the invention will become better understood with regard to the following detailed description of the preferred but non-limiting embodiment(s).

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The present invention provides a composition for manufacturing contact lenses having high water content, high oxygen permeability and lower modulus.

According to an aspect of the present invention, the composition for manufacturing contact lenses includes a first siloxane macromer with the number average molecular weight of 500 to 10,000, represented by the following formula (I), formula (I)

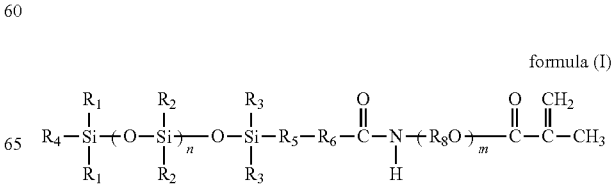

wherein $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$, $R_8$ are independently $C_1$-$C_4$ alkylene groups, m is an integer of 1 to 2 and n is an integer of 4 to 80; at least one hydrophilic monomer; a surfactant which is an urethane (meth)acrylate containing poloxamer and an initiator.

In an embodiment of the present invention, the first siloxane macromer represented by the above formula (I), includes a siloxane macromer represented by the following formula (I-1):

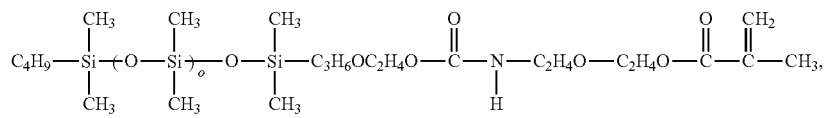

formula (I-1)

wherein o is an integer of 4 to 80.

In an embodiment of the present invention, the hydrophilic monomers for the composition for manufacturing the contact lenses includes but not limited to N-vinylpyrrolidone (NVP), 2-hydroxyethyl methacrylate (HEMA), N,N-dimethylacrylamide (DMA), methyl acrylic acid (MAA), acrylic acid, glycidyl methacrylate (GMA), (methyl)acrylamide, 2-(N,N-dimethylamino) ethyl methacrylate (DMAEMA), vinyl acetate, 2-(dimethylamino)ethyl methacrylate, N-acrylolmorpholine (ACMO) and a combination thereof.

Then, a poloxamer is known as a surfactant composed of polyoxyethylene units and polyoxyprolylene units in the chemical structure. According to different ratio between polyoxyethylene units and polyoxyprolylene units present in the structure, the hydrophilic surfactant or the hydrophobic surfactant could be obtained. Therefore, the poloxamer are used extensively in the polymer related applications.

However, for enhancing the water content of the contact lenses of the present invention, a hydrophilic carbamate group is introduced into the poloxamer. Besides, a vinyl functional group of the acrylate in the poloxamer is also introduced to crosslink with the first siloxane macromer, so that the contact lenses made from the specific structure poloxamer and the first siloxane macromer could provide the characteristics of high water content, high oxygen permeability and low modulus. Meanwhile, the contact lens-induced conjunctival straining (C.L.I.C.S) and discomfort of wearers can be improved.

In an embodiment of the present invention, the surfactant includes an urethane (meth)acrylate containing poloxamer represented by the following formula (II):

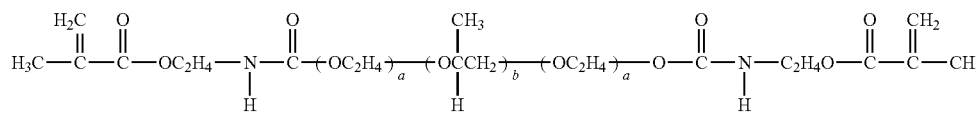

formula (II)

wherein, the a an b are both not zero.

In an embodiment, the poloxamer represented by the above formula (II), includes a poloxamer represented by the following formula (II-1), which is obtained from modified poloxamer 407 (Trade name is Lutrol F127 and is available from BASF).

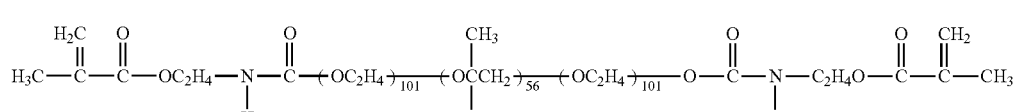

formula (II-1)

The aforementioned surfactant is also obtained from other modified poloxamer for pharmaceutical used such as Lutrol L44 (Poloxamer 124), Lutrol F68 (Poloxamer 124), Lutrol F87 (Poloxamer 188), or Lutrol L108 (Poloxamer 338).

In an embodiment, the initiator suitably used in conventional for manufacturing contact lenses can be a thermal initiator or a photo initiator. The suitable thermal initiator includes but not limited to azobisisoheptonitrile, 2,2'-azobis (isobutyronitrile) (AIBN), 2,2'-azobis(2,4-dimethylvaleronitrile) (ADVN), 2,2'-azobis(2-methyl-propanenitrile), 2,2'-azobis(2-methyl-butanenitrile). The suitable photoinitiator includes but not limited to 2-hydroxy-2-methylpropiophenone, 1-hydroxycyclohexyl phenyl ketone, 2,2-dimethoxy-2-phenylacetophenone, benzoin methyl ether, 2,2'-azobis-isobutyronitrile or 2,2-diethoxyacetophenone.

In an embodiment of the present invention, the composition for manufacturing contact lenses includes the first siloxane macromer represented by the above formula (I-1), at least one hydrophilic monomer, the surfactant represented by the above formula (II) and the initiator. In the embodiment, the hydrophilic monomer is a combination of NVP, HEMA and ACMO or a combination of NVP, HEMA, ACMO and DMA.

In the embodiment of the present invention, the first siloxane macromer represented by the above formula (I) is present at an amount of 35 to 55 parts by weight, the hydrophilic polymer is present at an amount of 40 to 65 parts by weight, the surfactant represented by the above formula (II) is present at an amount of 0.1 to 1.5 parts by weight and the initiator is present at an amount of 0.1 to 1.0 parts by weight.

Moreover, a second siloxane macromer with cross-linking functional groups in the both end caps also can be added in the material for forming contact lenses of the present invention.

In an embodiment, the second siloxane macromer with cross-linking functional groups in both ends includes but not limited to a surfactant represented by the following formula (III):

formula (III)

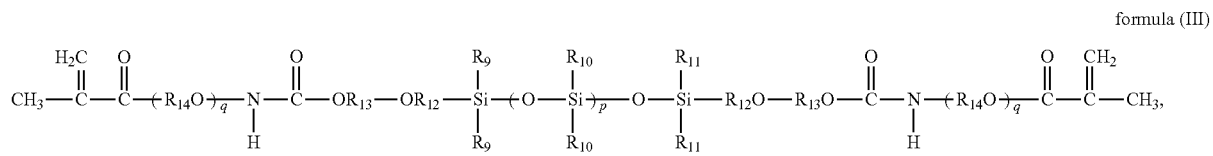

wherein $R_9$, $R_{10}$ and $R_{11}$ are independently $C_1$-$C_4$ alkyl groups, $R_{12}$, $R_{13}$, and $R_{14}$ are independently $C_1$-$C_3$ alkylene groups, p is an integer of 4 to 80 and q is an integer of 1 to 20 and the number average molecular weight thereof is 1,000 to 10,000.

In an embodiment of the present invention, the second siloxane macromer represented by the above formula (III) includes a siloxane macromer represented by the following formula (III-1):

formula (III-1)

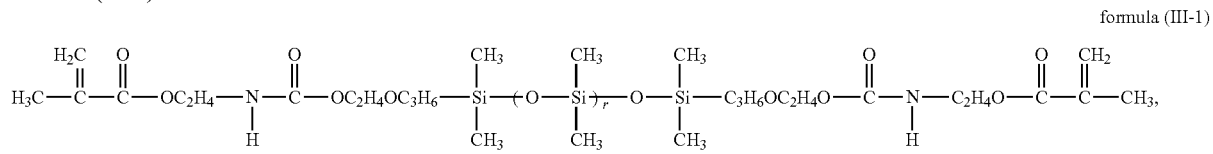

wherein r is an integer of 4 to 80.

In an embodiment of the present invention, the composition for manufacturing contact lenses includes the first siloxane macromer represented by the above formula (I-1), the second siloxane macromer represented by the above formula (III-1), at least one hydrophilic monomer, the surfactant represented by the above formula (II) and the initiator. In the embodiment, the hydrophilic monomer is a combination of NVP, HEMA and ACMO or a combination of NVP, HEMA, ACMO and DMA.

In embodiment of the present invention, the first siloxane macromer represented by the above formula (I-1) is present at an amount of 35 to 55 parts by weight, the second siloxane macromer represented by the above formula (III-1) is present at an amount of 1 to 10 parts by weight, the hydrophilic polymer is present at an amount of 40 to 65 parts by weight, the surfactant is present at an amount of 0.1 to 1.5 parts by weight and the initiator is present at an amount of 0.1 to 1.0 parts by weight.

In addition, the composition for manufacturing contact lenses can further includes but not limited to a dye and/or a UV-blocking agent.

According to another aspect of the present invention, a method for manufacturing contact lenses is provided. The contact lenses obtained by the method of contact lenses have high water content, high oxygen permeability and low modulus, so that the contact lens-induced conjunctival straining (C.L.I.L.S) of wearers are not caused easily and increasing comfort is obtained.

The present method can includes but not limited to the following steps. Firstly, a first siloxane macromer represented by the following formula (I), at least one hydrophilic monomer, a surfactant which is an urethane (meth)acrylate containing poloxamer, an initiator and the solvent are mixed to form a mixture. The formula (I) is shown as follows and the number average molecular weight thereof is 500 to 10,000.

formula (I)

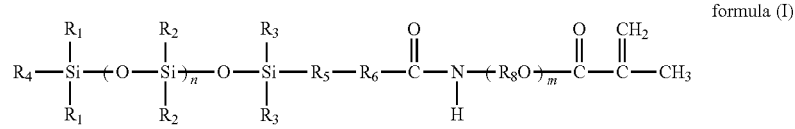

wherein $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$, $R_8$ are independently $C_1$-$C_2$ alkylene groups, m is an integer of 1 to 2 and n is an integer of 4 to 80.

In an embodiment of the present invention, the first siloxane macromer represented by the above formula (I), includes a siloxane macromer represented by the following formula (I-1):

formula (I-1)

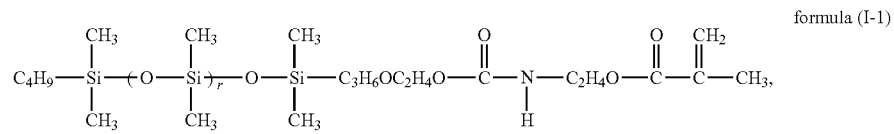

wherein r is an integer of 4 to 80.

In an embodiment of the method of the present invention, the hydrophilic monomers for the composition for manufacturing the contact lenses includes but not limited to N-vinylpyrrolidone (NVP), 2-hydroxyethyl methacrylate (HEMA), N,N-dimethylacrylamide (DMA), methyl acrylic acid (MAA), acrylic acid, glycidyl methacrylate (GMA), (methyl)acrylamide, 2-(N,N-dimethylamino) ethyl methacrylate (DMAEMA), vinyl acetate, 2-(dimethylamino) ethyl methacrylate, N-acrylolmorpholine (ACMO) and a combination thereof.

In an embodiment of the method of the present invention, the surfactant includes an urethane (meth)acrylate containing poloxamer represented by the following formula (II):

In an embodiment of the method of the present invention, the composition for manufacturing contact lenses includes the first siloxane macromer represented by the above formula (I-1), at least one hydrophilic monomer, the surfactant represented by the above formula (II) and the initiator. In the embodiment, the hydrophilic monomer is a combination of NVP, HEMA and ACMO or a combination of NVP, HEMA, ACMO and DMA.

In the embodiment of the method of the present invention, the first siloxane macromer represented by the above formula (I-1) is present at an amount of 35 to 55 parts by weight, the hydrophilic polymer is present at an amount of 40 to 65 parts by weight, the surfactant represented by the

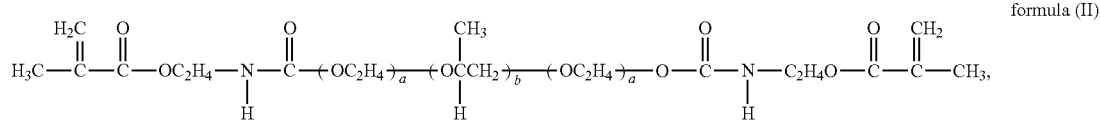

formula (II)

wherein, the a an b are both not zero.

In an embodiment of the method of the present invention, the poloxamer represented by the above formula (II), includes a poloxamer represented by the following formula (II-1) which is obtained from modified poloxamer 407 (Trade name is Lutrol F127 and is available from BASF).

above formula (II) is present at an amount of 0.1 to 1.5 parts by weight and the initiator is present at an amount of 0.1 to 1.0 parts by weight.

Moreover, in an embodiment of the method of the present invention, a second siloxane macromer with cross-linking

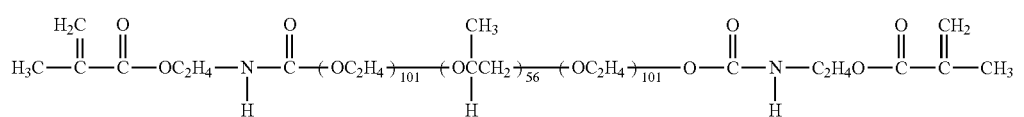

formula (II-1)

The aforementioned surfactant is also obtained from other modified poloxamer for pharmaceutical used such as Lutrol L44 (Poloxamer 124), Lutrol F88 (Poloxamer 124), Lutrol F87 (Poloxamer 188), or Lutrol L108 (Poloxamer 338).

In an embodiment of the method of the present invention, the initiator suitably used in conventional for manufacturing contact lenses can be a thermal initiator or a photo initiator.

functional groups in the both end caps also can be added in the material for forming contact lenses of the present invention.

In an embodiment of the method of the present invention, the second siloxane macromer with cross-linking functional groups in both ends includes but not limited to a surfactant represented by the following formula (III):

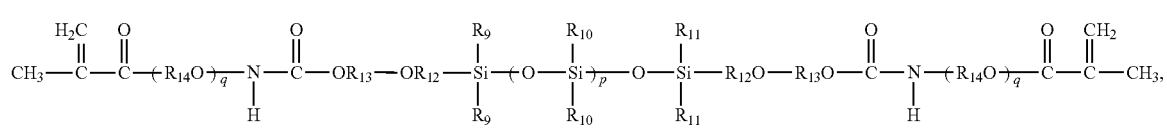

formula (III)

The suitable thermal initiator includes but not limited to azobisisoheptonitrile, 2,2'-azobis(isobutyronitrile) (AIBN), 2,2'-azobis(2,4-dimethylvaleronitrile) (ADVN), 2,2'-azobis (2-methyl-propanenitrile), 2,2'-azobis(2-methyl-butanenitrile). The suitable photoinitiator includes but not limited to 2-hydroxy-2-methylpropiophenone, 1-hydroxycyclohexyl phenyl ketone, 2,2-dimethoxy-2-phenylacetophenone, benzoin methyl ether, 2,2'-azobis-isobutyronitrile or 2,2-diethoxyacetophenone.

wherein $R_9$, $R_{10}$ and $R_{11}$ are independently $C_1$-$C_4$ alkyl groups, $R_{12}$, $R_{13}$ and $R_{14}$ are independently $C_1$-$C_3$ alkylene groups, p is an integer of 4 to 80 and q is an integer of 1 to 20 and the number average molecular weight thereof is 1,000 to 10,000.

In an embodiment of the method of the present invention, the second siloxane macromer represented by the above formula (III), includes a siloxane macromer represented by the following formula (III-1):

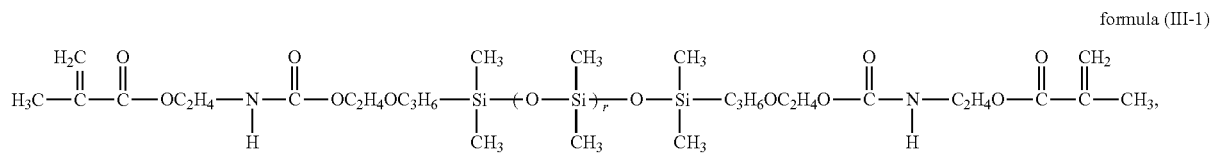

formula (III-1)

wherein r is an integer of 4 to 80.

In an embodiment of the method of the present invention, the composition for manufacturing contact lenses includes the first siloxane macromer represented by the above formula (I-1), the second siloxane macromer represented by the above formula (III-1), at least one hydrophilic monomer, the surfactant represented by the above formula (II) and the initiator. In the embodiment, the hydrophilic monomer is a combination of NVP, HEMA and ACMO or a combination of NVP, HEMA, ACMO and DMA.

In embodiment of the method of the present invention, the first siloxane macromer represented by the above formula (I-1) is present at an amount of 35 to 55 parts by weight, the second siloxane macromer represented by the above formula (III-1) is present at an amount of 1 to 10 parts by weight, the hydrophilic polymer is present at an amount of 40 to 65 parts by weight, the surfactant is present at an amount of 0.1 to 1.5 parts by weight and the initiator is present at an amount of 0.1 to 1.0 parts by weight.

In addition, the method for manufacturing contact lenses according to the present invention can further include but not limited to adding a dye and/or a UV-blocking agent into the mixture.

In the method of the present invention, after forming the mixture, the mixture is injected into a mold of contact lens and conducted a UV irradiation treatment or a thermal treatment to form contact lenses.

In an embodiment of the method of the present invention, the thermal treatment is conducted at temperature in the range between about 30° C. to 150° C., and the reaction time is in the range between about 1 hour to 12 hours. In another embodiment of the method of the present invention, the thermal treatment is conducted at temperature in a range between 30° C. to 70° C. for 0 hour to 2 hours, and then at temperature in a range between 70° C. to 100° C. for 2 hours to 4 hours and subsequently at temperature in a range between 100° C. to 150° C. for 4 hours to 12 hours.

After forming contact lenses, the method of the present invention can further include a hydration treatment. In an embodiment of the method of the present invention, the hydration treatment includes but not limited to the following steps.

Firstly, the contact lenses are soaked in alcohol solution, then soaked in water, and finally soaked in a buffer solution to reach equilibria.

According to a further another aspect of the present invention, a contact lens obtained by the method mentioned above is provided.

Finally, the tensile modulus of the contact lenses according to the present invention is about 0.40 MPa to 0.54 Mpa. The water content of the contact lenses is about 48% to 55%. Besides, the oxygen permeability of the contact lenses is more than 100.

The present invention will be explained in further detail with reference to the examples. However, the present invention is not limited to these examples.

1. Preparation of Siloxane Macromers

Example A. Preparation of the First Siloxane Macromer (I-1)

(I) The reaction scheme of the first siloxane macromer (I-1) is shown as follows:

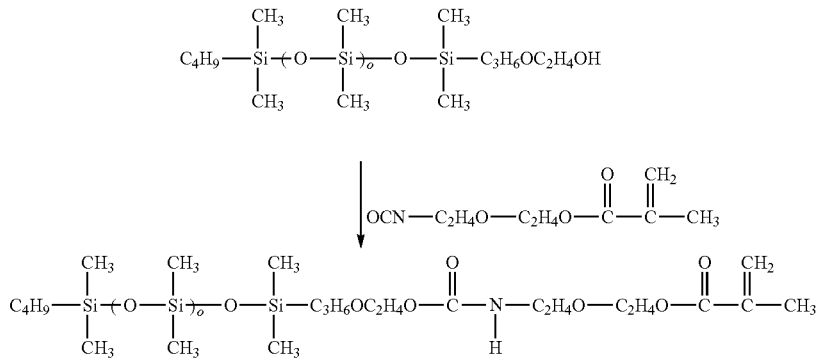

(II) Preparation of the First Siloxane Macromer (I-1)

20 g of monocarbinol terminated polydimethylsiloxane (Mw. is 1000, commercial code is MCR-C12, and is available from Gelest, US), 3.98 g of (2-(2-isocyanatoethyloxy) ethyl methacrylate, (commercial code is Karenz MOI-EG and is available from Showa Denko K.K., Japan), 0.025 g of dibutyltin dilaurate as a catalyst and 40 mL of methylene chloride were added to a flask to form a solution and then the solution was stirred at room temperature. After the solution was stirred at room temperature for 6 hours, the resulting reaction product was washed with a large amount of water and then dehydrated and filtered to obtain a raw product. Subsequently, the methylene chloride was evaporated to obtain the first siloxane macromer (I-1) (The number average molecular weight is 1200).

(III) The Properties of the First Siloxane Macromer (I-1)
The results of analysis were exhibited as follows:
IR Spectroscopy:
(i) Absorption bands derived from Si—$CH_3$ are at 802 $cm^{-1}$ and 1259 $cm^{-1}$.
(ii) Absorption bands derived from Si—O—Si are at 1032 $cm^{-1}$ and 1100 $cm^{-1}$.
NMR Spectroscopy:
(i) Peaks derived from Si—$CH_3$ are at around 0.19 ppm to 0.02 ppm
(ii) A peak derived from amide group is at 5.56 ppm.
(iii) A peak derived from methyl protons of methacryloyl group is at 1.93 ppm.
(iv) Peaks of vinyl protons of methacryloyl group are at 5.56 ppm and 6.11 ppm.

Example B. Preparation of the Second Siloxane Macromer (III-1)

(I) The reaction scheme of the second siloxane macromer (III-1) is shown as follows:

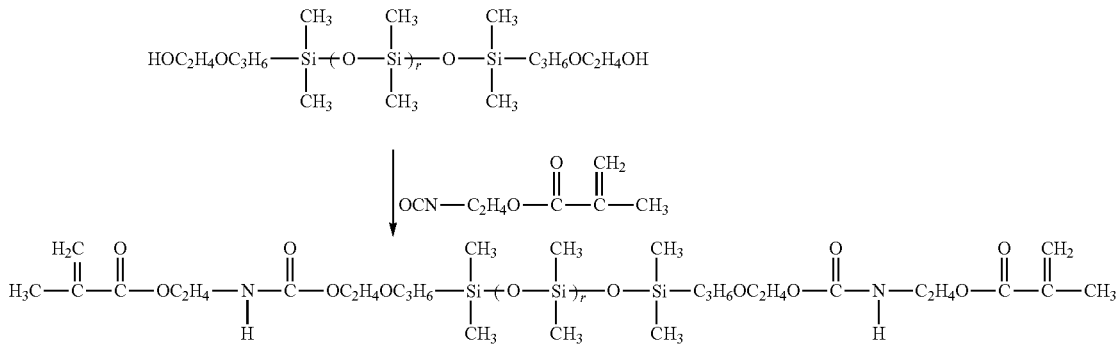

(II) Preparation of the Second Siloxane Macromer (III-1)

20 g of (α,ω-bis(2-hydroxyethoxypropyl)Polydimethylsiloxane (The number average molecular weight is 3000, commercial code is KF-6002, and is available from Shin Etsu Chemial Co., Ltd.), 2 g of 2-isocyanatoethyl methacrylate, (commercial code is IEM and is available from Sigma-Aldrich), 0.025 g of dibutyltin dilaurate as a catalyst and 50 mL of methylene chloride were added to a flask to form a solution and then the solution was stirred at room temperature. After the solution is stirred at room temperature for 6 hours, the resulting reaction product was washed with a large amount of water, and then dehydrated and filtered to obtain a raw product. Subsequently, the methylene chloride was evaporated to obtain a siloxane macromer (III-1) (The number average molecular weight is 3,300).

(III) The Properties of the Second Siloxane Macromer (III-1)

The results of analysis were exhibited as follows:
IR Spectroscopy:
(i) Absorption bands derived from Si—$CH_3$ are at 802 $cm^{-1}$ and 1259 $cm^{-1}$.
(ii) Absorption bands derived from Si—O—Si are at 1032 $cm^{-1}$ and 1100 $cm^{-1}$.
NMR Spectroscopy:
(i) Peaks derived from Si—$CH_3$ are at around 0.19 ppm to 0.02 ppm
(ii) A peak derived from amide group is at 5.01 ppm.
(iii) A peak derived from methyl protons of methacryloyl group is at around 1.92 ppm.
(iv) Peaks of vinyl protons of methacryloyl group are at around 5.567 ppm and 6.09 ppm.

2. Preparation of the Surfactant (I) The reaction scheme of the surfactant (II-1) is shown as follow:

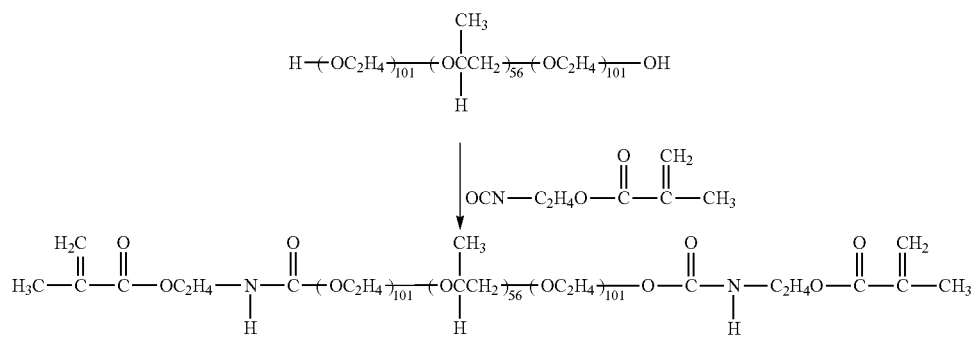

(II) Preparation of the Surfactant (II-1)

10 g of PEO-PPO-PEP copolymers (commercial code is Lutrol F127 and is available from Sigma-Aldrich) and 100 mL of methylene chloride were added to a flask to form a solution under the nitrogen gas condition. Next, 0.001 g of Dibutyltin dilaurate and 0.06 g of 2-isocyanatoethyl methacrylate, (commercial code is IEM and is available from Sigma-Aldrich) were added into the flask, then the solution was stirred at room temperature for 5 hours. Finally, the methylene chloride was evaporated to obtain a surfactant (II-1) (The number average molecular weight is 3,500).

3. Preparation of Contact Lenses

The preparations of the contact lenses of Example 1 to Example 3 are described in detail as follows and amounts of every component used in Examples are listed in Table 1. The physical properties of contact lenses are shown in Table 2.

(I) The Preparation of the Contact Lenses of Example 1 to Example 3

A first siloxane macromer (I-1), a second siloxane macromer (III-1), a surfactant (II-1), a thermal initiator, azobisisoheptonitrile (ADVN), UV absorbing agent, 2-[3-(2H-Benzotriazol-2-yl)-4-hydroxyphenyl]ethyl methacrylate (CAS No. is 96478-09-0), N,N-dimethylacrylamide (DMA), N-vinylpyrrodine (NVP), 2-hydroxyethyl methacrylate (HEMA), and N-acrylolmorpholine (ACMO) were mixed at the amounts shown in Table 1 and stirred about 1 hour to form a mixture.

Then, the mixture was injected into a mold of contact lens made of polypropylene (PP) and heated to initiate the radical polymerization thereof at 60° C. for 1 hours, then at 80° C. for 2 hours, and subsequently at 135° C. for 2 hours.

After the polymerization was completed, the mold was immersed in alcohol solution for 1 hour and the resulting molded lens was taken out of the mold. Then, the resulting lens was conducted a hydration treatment to obtain the contact lens with high oxygen permeability. Finally, a sterilizing treatment was conducted. The steps and the conditions of the hydration treatment and the sterilizing treatment were as follows:

The steps of hydration treatment of the contact lenses:

(a) The mold was immersed in 80% alcohol solution for 1 hour then the resulting molded lens was taken out of the mold.

(b) The polymer resulting molded lens was then immersed in 90% alcohol solution for 1 hour.

(c) The alcohol-immersed contact lens was then immersed in heated water at 80 t for 1 hour.

(d) The contact lens was immersed in a buffer solution to obtain equilibrium.

The conditions of sterilizing treatment: 121° C. for 30 minutes.

(II) The physical properties of the contact lenses prepared from Example 1 to Example 3, Comparative 1 (O₂OPTIX, commercially available from Ciba) and Comparative 2 (PureVision, commercially available from B&L) were measured according to the following measuring method. The resulting data were listed in the Table 2.

(a) Measurement of the Water Content of Contact Lenses

The contact lens was immersed in the phosphate buffered saline (PBS) for 24 hours at 23° C. Then, the contact lens was removed therefrom and was taken to remove all surface water. After that, the weight of contact lens was measured. Next, the contact lens was hydrated at 600 W for 5 minutes by microwave and after that the weight of hydrated contact lens was measured. The water content of contact lenses was calculated by the following equation:

(The weight of hydrated contact lenses−The weight of dry contact lenses)/The weight of hydrated contact lenses×100%.

(b) Measurement of Tensile Modulus and Tensile Strength of Contact Lenses

The test sample was cut from the middle area of a contact lens into a sample size of 10 mm. Then, the test sample was immersed in a buffer specified in ISO 18369-3 Section 4.7 for 2 hours. After that, the test sample was taken to remove all surface water and be conducted to proceed tensile modulus and tensile strength measurement by using an AI-3000 (available from Gotech Testing Maching Inc.) in a condition of temperature between 20±5° C. and a humidity between 55%±10%. The measurement was carried out at a constant loading speed of 10 mm/min. Finally, the tensile modulus and tensile strength were determined according to the initial gradient of the strain-stress curve. The unit of the tensile modulus is defined as MPa and the unit of tensile strength is defined as gram.

(c) Measurement of Oxygen Permeability of Contact Lenses

The oxygen permeability (Dk) was measured according to ISO standards 18369-4:2006, 4.4.3, by using a oxygen permeability tester (201T). The units of oxygen permeability (Dk) is defined as $10^{-10}$ (mlO₂ mm)/(cm² sec mm Hg).

As shown in Table 2, the contact lenses according to the present invention have higher water content than Comparative Examples. The water content of Example 1 to Example 3 are higher than 48%, and the water content of Comparative Examples are 33% and 36% respectively.

In addition, the oxygen permeability of Example 1 to Example 3 are more than 100, but the oxygen permeability of Comparative Example 1 and Comparative Example 2 are lower than 85.

Moreover, the tensile modulus of Comparative Examples are higher than 0.9 MPa. But the modulus of Example 1 to Example 3 are all lower than 0.54 MPa. The tensile modulus of Example 2 is even lower to 0.35 MPa.

As a result, the novel contact lens material for manufacturing contact lenses according to the present invention could provide characteristics of high water content, high oxygen permeability and low modulus.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

TABLE 1

The detailed composition of contact lenses of Example 1 to Example 3

| Composition | Function | Example (wt %) | | |
|---|---|---|---|---|
| | | 1 | 2 | 3 |
| First siloxane macromer (I-1) | Siloxane | 43.76 | 43.6 | 40.94 |
| Second siloxane macromer (III-1) | macromer | | | 6.14 |
| DMA | Hydrophilic | 5.2 | | |
| NVP | monomer | 32.77 | 35 | 31.03 |
| HEMA | | 14.3 | 15.54 | 14.33 |
| ACMO | | 0.33 | 1 | 0.31 |
| Surfactant (II-1) | Surfactant | 0.33 | 0.55 | 1.02 |
| ADVN | Photo initiator | 0.54 | 0.55 | 0.51 |
| 2-[3-(2H-Benzotriazol-2-yl)-4-hydroxyphenyl]ethyl methacrylate | UV Absorbing agent | 0.77 | 0.76 | 0.72 |
| Ethanol | Solvent | 2 | 3 | 5 |

TABLE 2

The measurement results of Example 1 to Example 3 and Comparative Example 1 and Comparative Example

| Test item | Example 1 | Example 2 | Example 3 | Comparative Example 1 | Comparative Example 2 |
|---|---|---|---|---|---|
| Water content (%) | 53.7 | 54.6 | 48.6 | 36 | 33 |
| Tensile modulus (MPa) | 0.4 | 0.35 | 0.54 | 1 | 0.93 |
| Tensile strength (g) | 35.5 | 47.2 | 76.5 | 103 | 60 |
| Oxygen permeablilty (Dk) | 103.4 | 101.78 | 100 | 75 | 84 |

What is claimed is:

1. A material for manufacturing contact lenses comprising:
   a first siloxane macromer with the number average molecular weight in a range of 500 to 10,000, represented by the following formula (I)

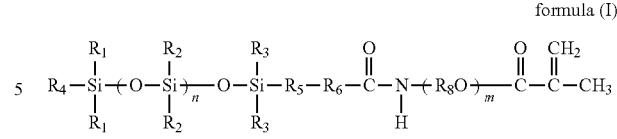

formula (I)

wherein $R_1$, $R_2$ and $R_3$ are independently $C_1$-$C_4$ alkyl groups, $R_4$ is $C_1$-$C_6$ alkyl group, $R_5$ is $C_1$-$C_2$ alkylene group, $R_6$ is —$OR_7O$— or —NH—, $R_7$, $R_8$ are independently $C_1$-$C_4$ alkylene groups, m is an integer of 1 to 2 and n is an integer of 4 to 80;
   a second siloxane macromer with cross-linking functional groups in the both end caps;
   at least one hydrophilic monomer;
   a surfactant which is an urethane (meth)acrylate containing poloxamer, wherein the urethane (meth)acrylate containing poloxamer is obtained from modified poloxamer 407, modified poloxamer 124, modified poloxamer 188, or modified poloxamer 338; and
   an initiator.

2. The material for manufacturing contact lenses according to claim 1, wherein the first siloxane macromer comprises a siloxane macromer represented by the following formula (I-1):

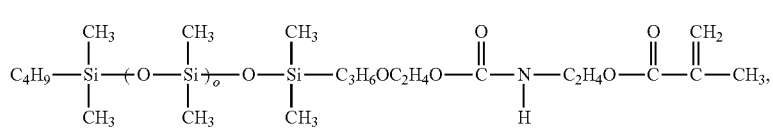

formula (I-1)

wherein o is an integer of 4 to 80.

3. The material for manufacturing contact lenses according to claim 1, wherein the hydrophilic monomer is selected from the group consisting of N-vinylpyrrolidone (NVP), 2-hydroxyethyl methacrylate (HEMA), N,N-dimethylacrylamide (DMA), methyl acrylic acid (MAA), acrylic acid, glycidyl methacrylate (GMA), (methyl)acrylamide, 2-(N,N-dimethylamino) ethyl methacrylate (DMAEMA), vinyl acetate, 2-(dimethylamino)ethyl methacrylate, N-acrylolmorpholine (ACMO) and a combination thereof.

4. The material for manufacturing contact lenses according to claim 1, wherein the first siloxane macromer of formula (I) is present at an amount of 35 to 55 parts by weight, the hydrophilic monomer is present at an amount of 40 to 65 parts by weight, the surfactant is present at an amount of 0.1 to 1.5 parts by weight and the initiator is present at an amount of 0.1 to 1.0 parts by weight.

5. The material for manufacturing contact lenses according to claim 1, wherein the second siloxane macromer comprises a siloxane macromer represented by the following formula (III):

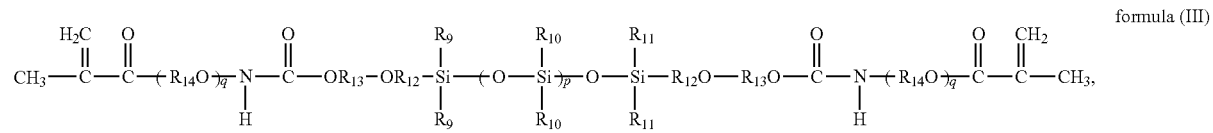

formula (III)

wherein $R_9$, $R_{10}$ and $R_{11}$ are independently $C_1$-$C_4$ alkyl groups, $R_{12}$, $R_{13}$ and $R_{14}$ are independently $C_1$-$C_3$ alkylene groups, p is an integer of 4 to 80 and q is an integer of 1 to 20.

6. The material for manufacturing contact lenses according to claim 5, wherein the second siloxane macromer comprises a siloxane macromer represented by the following formula (III-1):

formula (III-1)

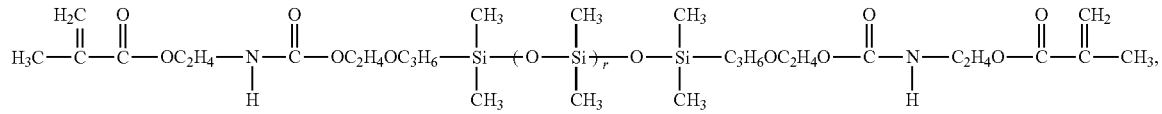

wherein r is an integer of 4 to 80.

7. The composition for manufacturing contact lenses according to claim 1, wherein the first siloxane macromer is present at an amount of 35 to 55 parts by weight, the second siloxane macromer is present at an amount of 1 to 10 parts by weight, the hydrophilic monomer is present at an amount of 40 to 65 parts by weight, the surfactant is present at an amount of 0.1 to 1.5 parts by weight and the initiator is present at an amount of 0.1 to 1.0 parts by weight.

8. The composition for manufacturing contact lenses according to claim 1, further comprising a dye and/or an UV-blocking reagent.

9. A method for manufacturing contact lenses comprising:
(a) mixing a first siloxane macromer represented by the following formula (I), a second siloxane macromer with cross-linking functional groups in the both end caps, at least one hydrophilic monomer, a surfactant which is an urethane (meth)acrylate containing poloxamer, an initiator and a solvent to form a mixture, wherein the urethane (meth)acrylate containing poloxamer is obtained from modified poloxamer 407, modified poloxamer 124, modified poloxamer 188, or modified poloxamer 338; and
(b) injecting the mixture into a mold of contact lens and conducting a thermal treatment or a UV irradiating treatment to the mixture to form contact lenses;
wherein the number average molecular weight of the first siloxane macromer of formula (I) is 500 to 10,000:

formula (I)

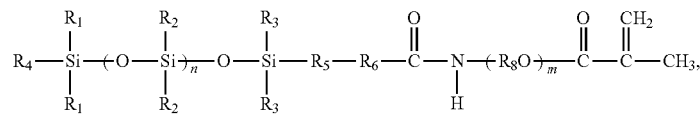

wherein $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$, $R_8$ are independently $C_1$-$C_2$ alkylene groups, m is an integer of 1 to 2 and n is an integer of 4 to 80.

10. The method for manufacturing contact lenses according to claim 9, wherein the first siloxane macromer comprises a siloxane macromer represented by the following formula (I-1):

formula (I-1)

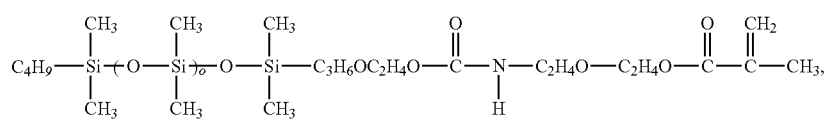

wherein o is an integer of 4 to 80.

11. The method for manufacturing contact lenses according to claim 9, wherein the hydrophilic monomer is selected from the group consisting of N-vinylpyrrolidone (NVP), 2-hydroxyethyl methacrylate (HEMA), N,N-dimethylacrylamide (DMA), methyl acrylic acid (MAA), acrylic acid, glycidyl methacrylate (GMA), (methyl)acrylamide, 2-(N,N-dimethylamino) ethyl methacrylate (DMAEMA), vinyl acetate, 2-(dimethylamino)ethyl methacrylate, N-acrylolmorpholine (ACMO) and a combination thereof.

12. The method for manufacturing contact lenses according to claim 9, wherein the first siloxane macromer of formula (I) is present at an amount of 35 to 55 parts by weight, the hydrophilic monomer is present at an amount of 40 to 65 parts by weight, the surfactant is present at an amount of 0.1 to 1.5 parts by weight and the initiator is present at an amount of 0.1 to 1.0 parts by weight.

13. The method for manufacturing contact lenses according to claim 9, wherein the second siloxane macromer comprises a siloxane macromer represented by the following formula (III):

formula (III)

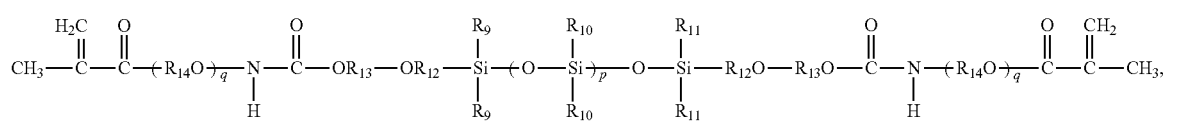

wherein $R_9$, $R_{10}$ and $R_{11}$ are independently $C_1$-$C_4$ alkyl groups, $R_{12}$, $R_{13}$ and $R_{14}$ are independently $C_1$-$C_3$ alkylene groups, p is an integer of 4 to 80 and q is an integer of 1 to 20.

14. The method for manufacturing contact lenses according to claim 13, wherein the second siloxane macromer comprises a siloxane macromer represented by the following formula (III-1):

formula (III-1)

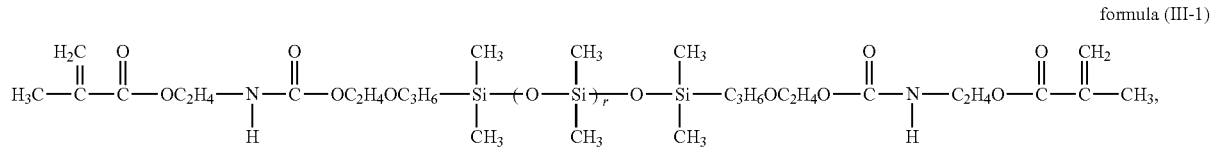

wherein r is an integer of 4 to 80.

15. The method for manufacturing contact lenses according to claim 9, wherein the first siloxane macromer is present at an amount of 35 to 55 parts by weight, the second siloxane macromer is present at an amount of 1 to 10 parts by weight, the hydrophilic monomer is present at an amount of 40 to 65 parts by weight, the surfactant is present at an amount of 0.1 to 1.5 parts by weight and the initiator is present at an amount of 0.1 to 1.0 parts by weight.

16. The method for manufacturing contact lenses according to claim 9, further comprising a dye and/or an UV-blocking reagent.

17. A contact lens which is obtained by the method for manufacturing lenses according to claim 9.

* * * * *